Dec. 31, 1929.    O. D. McCLURE    1,741,643
PLUNGER PUMP
Filed June 30, 1928
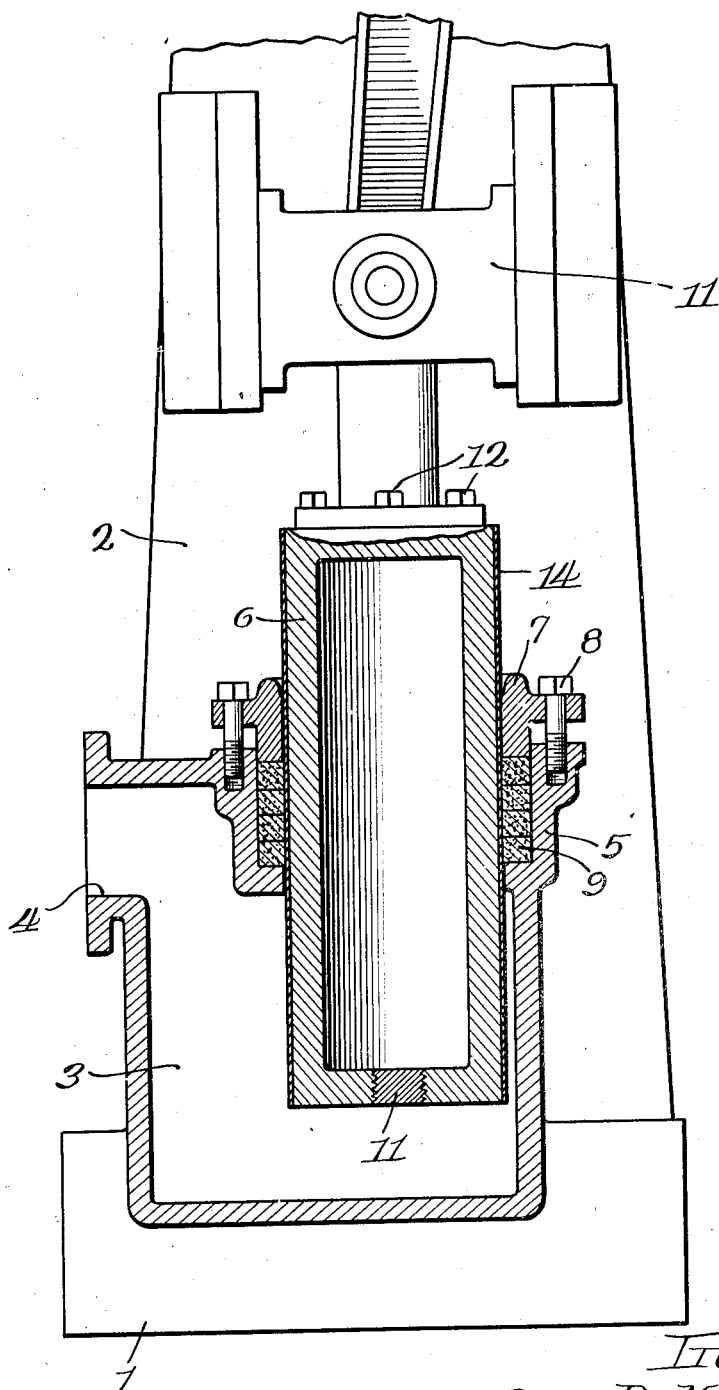
Inventor
Ora D. McClure
By Fisher, Clapp, Soans & Pond
Attys.

Patented Dec. 31, 1929

1,741,643

UNITED STATES PATENT OFFICE

ORA D. McCLURE, OF ISHPEMING, MICHIGAN

PLUNGER PUMP

Application filed June 30, 1928. Serial No. 289,403.

The invention relates to high pressure, plunger or displacement pumps, and seeks to provide an improved plunger therefor which will reduce gland friction and wear on the packing through which the plunger moves and which will also be of stout construction and economical to manufacture.

The plungers of displacement pumps, particularly if employed in connection with high pressures, are subject to constant wear from gritty material and the action of the packing on the surface thereof, so that frequent renewals of the plunger and packing are usually required. In the attempt to avoid this difficulty, plungers have been formed of chilled cast iron provided with a ground surface, but such surfaces are not perfectly smooth and hence cause excessive wear of the gland packing. It is also old to form the pump plunger of a porcelain sleeve mounted on and secured to a central core, and such a sleeve has a very smooth surface which facilitates lubrication, reduces friction and prolongs the life of the gland packing. But such porcelain sleeves are quite expensive to manufacture and they are not well adapted to withstand the strains set up by the mechanical means employed for fastening them in position, so that they at times break in service. It has also been proposed to form plungers by casting thick glass bodies on central cores, but this method has not been practiced with any success.

In accordance with the present invention, the body of the plunger, which is preferably hollow, is formed of ordinary cast iron and this cast iron body is provided with a thin coat or glaze of porcelain which is fused upon its cylindrical surface. Such a plunger is of stout durable construction and has a very smooth surface which can be ground, if necessary, to a true cylinder, so that the gland friction and the wear upon the plunger and packing is reduced to negligible quantities.

The invention is hereinafter more fully set forth in detail, is illustrated in the preferred form in the accompanying drawing and particularly defined in the appended claims.

The drawing is a vertical section of one form of displacement pump provided with the improved plunger.

The frame in the form shown comprises a cast iron base 1, an upright portion 2 and a displacement or pump chamber 3, the latter having a flanged opening 4 by which the displacement chamber is connected, as usual, to another chamber having inlet and outlet valves. The pump chamber is also provided, as usual, with a stuffing box 5 through which the plunger 6 extends. A gland 7 adjustably secured to the outer end of the stuffing box by bolts 8 or otherwise, compresses the packing 9 to maintain a liquid tight joint at the cylindrical surface of the plunger.

The plunger comprises a hollow body of ordinary cast iron having an opening in its lower end which is closed by a plug 10 after the core is removed. As usual, a crosshead 11 is suitably secured to the upper end of the plunger as by means of bolts 12 or is cast in piece therewith. The crosshead is arranged as usual between suitable guides 13 mounted on the pump frame.

By sprinkling suitable enameling powder upon the cast iron body of the pump plunger while the latter is highly heated,—to about 1200° F. or higher,— a thin coating or glaze 14 of porcelain is fused on its cylindrical surface. Such a porcelain coat or glaze is not subject to corrosion, and is very smooth so that friction and wear of the plunger and packing is very materially reduced. Preferably also, the porcelain coat is ground to a true cylindrical surface to aid in reducing friction and wear upon the parts. Such a plunger construction is not expensive to manufacture, is practically indestructible and, for the reasons noted, very materially prolongs the life of the gland packing which at present is a very considerable item of expense, particularly in the use of plunger pumps with very high pressures.

Changes may be made in the details of the pump structure without departure from the invention as defined in the claims.

I claim as my invention:

1. A plunger for high pressure displacement pumps having a hollow body of ordinary cast iron adapted to be bolted to the pump cross head and a thin surfacing layer of porcelain fused upon said hollow body, substantially as described.

2. A plunger for high pressure displacement pumps having a body of ordinary cast iron adapted to be bolted at one end to the pump cross-head and a thin surfacing layer of porcelain fused to said cast-iron body and ground to a true cylindrical surface, substantially as described.

3. In a high pressure, plunger pump, a cross-head and a displacement plunger comprising a hollow body of cast-iron bolted at one end to said cross-head and having a thin, surfacing layer of porcelain fused thereon for contacting with the gland packing of the pump, substantially as described.

ORA D. McCLURE.